Patented Mar. 18, 1941

2,235,480

UNITED STATES PATENT OFFICE 2,235,480

AMIDELIKE DERIVATIVES AND PROCESS OF MAKING THE SAME

Charles Graenacher, Riehen, Franz Ackermann, Binningen, and Heinrich Bruengger, Basel, Switzerland, assignors to the firm of Society of Chemical Industry in Basle, Basel, Switzerland No Drawing. Application November 8, 1937, Serial No. 173,528. In Switzerland November 11, 1936

14 Claims. (Cl. 260—153)

This invention relates to the manufacture of new condensation products by treating compounds which are free from hydroxyl groups and obtainable by reacting primary amines with carboxylic acid chlorides or such other compounds containing mobile halogen atoms, for example cyanuric chloride, trichloropyrimidine, methyldichloropyrimidine, 2:6-dichloroquinazoline, monochlorophthalazine and the like, which consist of a six-membered heterocyclic ring consisting itself of nitrogen atoms and carbon atoms and which contain at least once the atom grouping $$-\underset{\text{halogen}}{\overset{|}{C}}=N-$$

with an acylating agent containing besides the group which determines the acylation at least one substituent which lends, if desired after suitable conversion, to the new product solubility or increased solubility.

Compounds which are free from hydroxyl groups and obtainable as indicated above are, for example, the products of the general formula

and

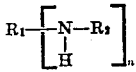

wherein $n$ stands for a whole number which is greater than one and smaller than 4, $R_1$ stands for the residue of a carboxylic acid or for the radical of a heterocyclic six-membered system whose heterocyclic six-membered ring consists of carbon and nitrogen atoms of which at least 2 and not more than 4 are carbon atoms and at least two and not more than 3 are nitrogen atoms, not more than two nitrogen atoms being linked with each other, which heterocyclic six-membered ring contains at least twice and not more than three times the atom grouping

and

stands for the radical of a primary amine.

The compounds corresponding to the above explained general formulas

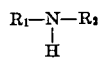

and

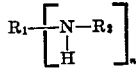

may or may not have dyestuff character; further they may belong to various classes of compounds of the organic chemistry. Thus they may be aliphatic-aromatic, aliphatic-cyclo-aliphatic, aromatic-heterocyclic, heterocyclic-cyclo-aliphatic, and the like.

Acylating agents which contain besides the acylating groups a substituent which enhances the solubility of the new condensation product, particularly in water, are for example halides or anhydrides of at least dibasic aliphatic, hydroaromatic or aromatic acids which contain sulfogroups or carboxyl groups or both, or halides or anhydrides of acids which contain alkylaminogroups besides the acid residues, so that after acylation the acyl residue still contains groups which can be converted into alkali metal compounds or quaternary ammonium compounds. The acylation is conducted in presence of a tertiary base, for instance pyridine, acylating agents may therefore be used of which the non-acylating substituent enters into reaction with the tertiary base and thereby enhances the solubility of the parent material. As examples of the acylating agents defined in this paragraph there may be named halides of sulfo-carboxylic acids in which both the sulfo-group and the carboxyl group is in the form of a halide; also those in which only the sulfo-group or the carboxyl group is present in the form of halide such as the halide of sulfo-benzoic acids, of sulfonaphthoic acids, of sulfoacetic acid or the like; also the 4-dialkyl-amino-1-benzoyl halides, the 4-halogenalkyl-1-benzoyl halides and the like (compare in this respect the statements of applications Serial No. 92,244 of July 23, 1936, and No. 92,245 of July 23, 1936).

The acylation process may be conducted, for example by heating a parent material with the acylating agent in presence of a tertiary base.

It is especially recommended, however, that the operation should be conducted in the presence of pyridine. Dimethylaniline may also be used.

By the process of condensation sparingly soluble to insoluble parent materials may be converted into products which are more easily soluble. These soluble or freely soluble compounds may then be used as such or be regenerated to the insoluble to sparingly soluble parent material by treatment with a saponifying agent, for instance dilute caustic alkali or dilute acid. The regenerated material may in this manner be fixed fast upon or in a substratum, for example on or in a fiber or an artificial mass. In this manner various effects such as matting or coloring may be produced.

When aliphatic bodies are selected for the condensation, for example an amide of a fatty acid of high molecular weight, such as stearic acid, and an aliphatic primary amine, for instance mono-ethylamine, there are obtained according to the choice of the acylating agent assistants having cation activity or anion activity. Products having a similar action are further obtained if aliphatic-aromatic or aliphatic-heterocyclic or aliphatic-cycloaliphatic products, such as the amides from higher fatty acids, for example oleic acid or cocoanut oil fatty acid and aniline or cyclohexylamine, are subjected to the new reaction.

Condensation products from sparingly soluble colorless aromatic compounds, for instance the condensation product from 1 mol cyanuric chloride and 3 mols of a primary uncolored aromatic base, may be used for example as a matting agent.

Especially valuable, however, are parent materials which have at the same time a more or less strongly pronounced dyestuff character and contain the aforesaid atomic grouping, especially dyestuffs which are sparingly soluble or insoluble. These dyestuffs may belong to various series, for example the azo-dyestuff series or the vat dyestuff series, for instance the anthraquinone series. They may, however, belong to other series, for example those of the nitro-, azine- or thiazine dyestuffs. Such dyestuffs may be also metallic compounds; thus as compounds which contain no hydroxyl groups there may also be considered compounds which contain masked hydroxyl groups, as is the case, for example, in the chromium compounds of the mordant dyestuffs. Among such dyestuffs those are of especial value which are of such a composition that they or their soluble derivatives have an affinity for vegetable fibers.

The condensation products obtainable from parent materials having dyestuff characteristics and capable of reversion by action of a saponifying agent, for instance an alkali, to the sparingly soluble dyestuff may be used, for example, for producing fast dyeings by the process of Patent No. 2,095,600. If the acyl residue which lends solubility is sufficiently stable towards saponifying agents, insoluble dyestuffs may be converted into those which may be used by the methods usual for dyeing with water-soluble dyestuffs.

The new process consists therefore in causing acylating agents containing besides the group effecting the acylation at least one group which reacts with the tertiary amine with formation of salts, to act in the presence of a tertiary base on compounds which are free from hydroxyl groups and correspond to the above explained general formulas

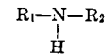

and

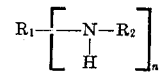

The new products therefore correspond to the general formulas

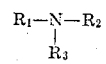

and

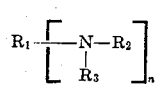

in which $n$ stands for a whole number which is greater than one and smaller than 4,

stands for the divalent radical of an amine which is substituted twice at the nitrogen atom, $R_1$ stands for the radical of an organic carboxylic acid or the radical of a heterocyclic six-membered ring system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and at the most three times the atom grouping

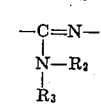

and $R_3$ stands for an acyl radical containing at least one salt forming group selected from the group consisting of carboxyl groups, sulfonic groups and quaternary ammonium groups. They may be used for improving or dyeing various materials, for example vegetable and animal fibers, such as wool, silk, leather or artificial fibers, for instance fibers from regenerated cellulose or cellulose derivatives, and natural or artificial masses.

A preferred method of working of the new process consists in treating dyestuffs of the azo or anthraquinone series corresponding to the above explained formula

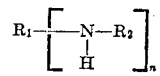

which are free from hydroxyl, sulfonic and carboxyl groups, but correspond to the already explained formula $R_1$—NH—$R_2$, wherein —N—$R_2$ stands for the radical of an aminoazo-dyestuff or of a dyestuff of the anthraquinone series containing an amino-group, in the presence of pyridine with halides of mono-nuclear aromatic acids which contain simultaneously one carboxyl group besides one or two sulfonic groups.

The products thus obtained are therefore also acid amide-like derivatives of the general formulas

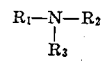

and

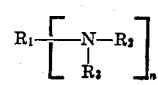

in which $n$ stands for a whole number which is greater than one and smaller than 4, $$-\underset{\underset{}{|}}{N}-R_2$$

stands for the divalent radical of an amine, said amine being an amino-azo- or an amino-anthraquinone-dyestuff which is free from hydroxyl groups and carboxyl groups, $R_1$ stands for the radical of a heterocyclic six-membered ring system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and at the most three times the atom grouping $$\begin{array}{c}-C=N-\\ |\\ N-R_2\\ |\\ R_3\end{array}$$

and $R_3$ corresponds in the free state to

[structure: $-\underset{\underset{O}{\|}}{C}-\text{cyclohexyl ring with } y \text{ and } x$]

($x$ standing for $SO_3H$ and $y$ for a member of the group consisting of H and $SO_3H$) which products are water-soluble powders which, when treated with mild saponifying agents, regenerate the azo-dyestuffs or anthraquinone dyestuffs free from radicals $R_3$, hydroxyl, carboxyl and sulfonic groups and corresponding to the formula $$R_1 \left[ -\underset{\underset{H}{|}}{N}-R_2 \right]_n$$

$n$, $R_1$ and $$-\underset{\underset{}{|}}{N}-R_2$$

having, apart from the foregoing statement, the meaning given at the beginning of this paragraph.

The following examples illustrate the invention without however limiting the same, the parts being by weight:

Example 1

3 parts of stearoylmethylamide, 4.4 parts of benzoic acid 3-sulfochloride and 30 parts of pyridine are heated together for one hour at 80–90° C. until a sample dissolves clearly in water. After removal of nearly all the pyridine in a vacuum, the bright liquid residue is taken up with 400 parts of water and then neutralized with dilute sodium carbonate solution, and the product of reaction is salted out with sodium chloride. It is filtered and dried. The nearly white product obtained in this manner in solid form dissolves in water to a colorless clear solution with formation of a strong foam. It corresponds probably in the free state to one of the formulas $$CH_3(CH_2)_{16}-\underset{\underset{}{\|}}{C}-\underset{\underset{}{|}}{N}\begin{array}{c}CH_3\\ \\ C=O\\ \\ \text{phenyl-}SO_3H\end{array}$$

and $$CH_3-(CH_2)_{16}-C=N-CH_3$$
$$\underset{\underset{O=C-\text{phenyl-}SO_3H}{|}}{O}$$

By mixing the solution with aqueous alkali the product is split with separation of the insoluble parent material.

A like product is obtained by substituting lauroyl anilide or the lauroylcyclohexylamide for the stearoylmethylamide.

In like manner benzoic acid ethylamide may be converted into a soluble derivative.

Example 2

To 17.7 parts of the condensation product from 1 mol of cyanuric chloride and 3 mols aniline in 100 parts of pyridine are added 44 parts of benzoic acid meta-sulfo chloride and the temperature is allowed to rise to 80° C. The mixture is then stirred at 80° C. until a sample dissolves clearly in water, which happens after about 30 minutes.

After working up the product as described in Example 1 there is obtained a bright powder soluble in water and capable of being split by alkalies. The new product corresponds probably to one of the two following formulas

[structure: triazine ring with three $-N(\text{phenyl})-CO-\text{phenyl-}SO_3Na$ substituents]

and

[structure: triazine ring with two $-NH-\text{phenyl}$ and one $HN-\text{phenyl}$ substituents]

in which at least two of the hydrogen atoms linked to the nitrogen atoms are replaced by the atom grouping $$-\underset{\underset{O}{\|}}{C}-\text{phenyl-}SO_3H$$

In similar manner may be treated the condensation product from 1 mol cyanuric chloride, 2 mols aniline and 1 mol ammonia or the product produced by substituting for the 1 mol of ammonia an organic primary amine, for instance monoethylamine, monoamylamine, cyclohexylamine, orthotoluidine, α-naphthylamine, α-aminoanthracene, aminochrysene, aminocarbazole or aminonaphthocarbazole.

Products with similar properties are also produced if there is used as parent material instead of the condensation product from 1 mol cyanuric chloride and 3 mols aniline, the condensation product from 1 mol phenyldichloropyrimidine or 1 mol of 2:4-dichloroquinazoline and 2 mols of a primary amine prescribed in the last preceding paragraph, for example the condensation product from 1 mol 2:4-dichloroquinazoline, 1 mol aniline and 1 mol cyclohexylamine may be used.

Finally, there may be substituted for the benzoic acid metasulfochloride another acylating agent of the kind hereinbefore defined, for instance sulfosalicylic acid chloride, benzoic acid-3:5-disulfochloride, sulfochloracetic acid chloride, 1:3:6-naphthalenetrisulfochloride, benzene hexacarboxylic acid chloride, naphthoic acid dissulfochloride, furane-α:α'-sulfocarboxylic acid chloride and the like. The formula of such a product is for example

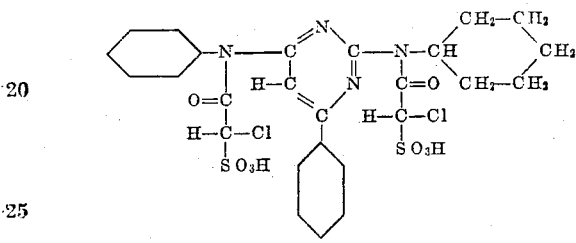

In a similar manner there is obtained from 2:4-dinitrodiphenylamine and benzoic acid-meta-disulfochloride a water-soluble product of the formula

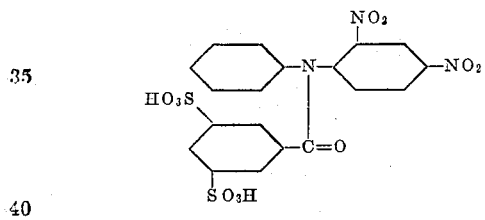

the aqueous solution of which regenerates the difficultly soluble nitro dyestuff on addition of alkalies.

*Example 3*

1.65 parts of benzoylaminoazotoluene, 2.3 parts of benzoic acid 3:5-disulfochloride and 30 parts of pyridine are heated together for 3 hours at 110–115° C., whereby the insoluble parent material becomes soluble in water. The pyridine is distilled as far as possible in a vacuum. The residue is taken up with 100 parts of methyl alcohol, the solution is filtered from a little insoluble substance and the filtrate is evaporated. There is thus obtained a dark viscid product corresponding probably to one of the two formulas

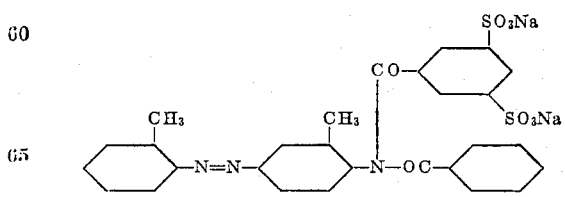

and

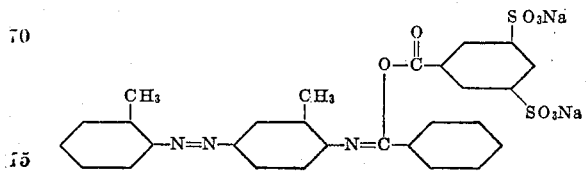

which dissolves clearly in cold water. When the aqueous solution is heated and dilute sodium carbonate solution is added thereto there is a rapid decomposition, the decomposition product proving to be benzoylaminoazotoluene (melting point 178° C.).

A similar product is obtained if instead of the benzoylaminoazotoluene there is used, for example, the condensation product from 2 mols 4-aminoazobenzene and 1 mol 2:4-dichloroquinazoline.

Similar properties are possessed by the condensation products which are obtained with the aid of further acylation by the agents prescribed in Example 2.

Instead of pyridine there may be used wholly or in part another tertiary amine, for instance dimethylaniline or tripropylamine.

*Example 4*

7.5 parts of condensation product from 3 mols aminoazotoluene and 1 mol cyanuric chloride are stirred with 70 parts of pyridine. 11.4 parts of benzoic acid metadisulfochloride are strewn into the mixture and the temperature is allowed to rise to 60° C. and the whole is stirred for about 1 hour at this temperature. The pyridine is then distilled. The residue is taken up with water, the acid liquid is neutralized, if necessary by means of a weak alkaline agent, for instance sodium triphosphate, and the condensation product is salted out, for instance with sodium chloride. After filtering and drying the product is an orange powder which, if desired, may be obtained free from inorganic salts by treatment with methyl alcohol. It dissolves in water to a yellow solution from which the parent pigment may be precipitated by means of alkali. The water-soluble product corresponds to probably to one of the two formulas

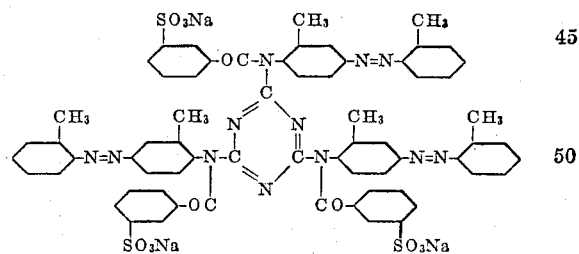

and

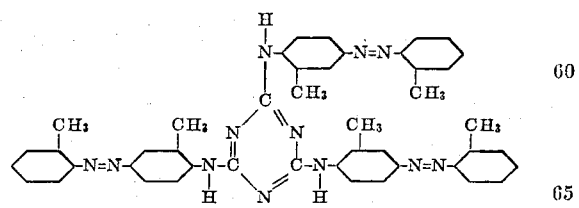

in which at least two of the hydrogen atoms linked to the nitrogen atoms are replaced by the atom grouping

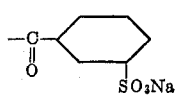

Similar products are produced when in the parent material one mol of the condensed aminoazotoluene is exchanged for ammonia or a primary or secondary organic amine. Such amines are, for example, aliphatic amines, for instance methylamine, allylamine or amylamine, cycloaliphatic bases, for instance cyclohexylamine, heterocyclic bases, for instance aminotetrazole or morpholine, aromatic bases, for instance aniline, monomethylaniline, α- or β-naphthylamine, α-aminoanthracene, aminocarbazole, aminobenzanthrone, aminopyrene or the like. Similar products are also produced when in the parent material the cyanuric chloride is exchanged for another heterocyclic compound, for instance tribromopyrimidine, dichloroquinazoline, dichlorophenyltriazine. In the last cases obviously only 2 mols of the aminoazo-dyestuff or 1 mol of the aminoazo-dyestuff and 1 mol of ammonia or a primary amine can be condensed. Furthermore, a chloride of the sulfobenzoic acid may be exchanged for another acylating agent, for example for naphthoic acid disulfochloride. The formulas probably of such condensation products are for example

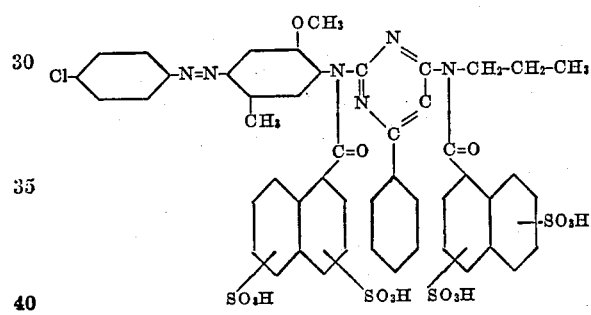

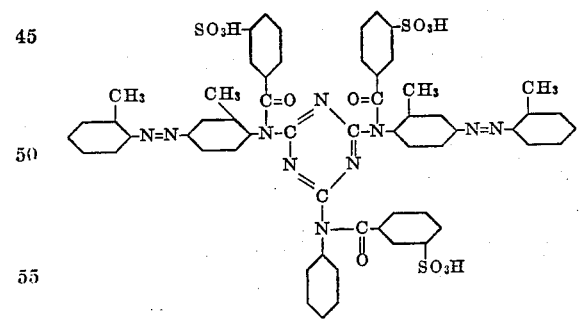

or

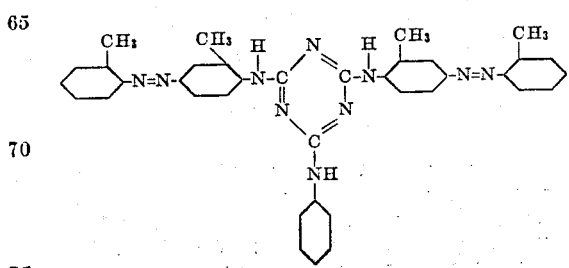

in which at least two of the hydrogen atoms linked to the nitrogen atoms are replaced by the atom grouping

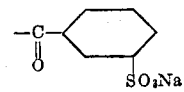

*Example 5*

13.3 parts of 2-acetylaminoanthraquinone are stirred with 100 parts of pyridine. Into the mixture are strewn 24 parts of benzoic acid metadisulfochloride and the temperature is allowed to rise to about 80° C. As soon as a sample of the condensation mixture dissolves in water the pyridine is distilled in a vacuum at as low a temperature as possible.

The solid residue which corresponds probably to one of the two following formulas

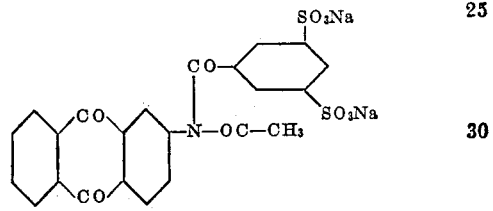

or

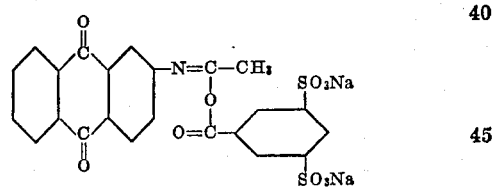

dissolves in water. By addition of alkali the parent pigment can be precipitated from the solution.

A product with similar properties is obtained by using equimolecular quantities of 1- or 2-benzoylaminoanthraquinone or of the condensation product from 1 mol of aminoanthraquinone, 2 mols of aniline and 1 mol of cyanuric chloride instead of 2-acetylaminoanthraquinone.

*Example 6*

30 parts of the condensation product from 1 mol cyanuric chloride, 2 mols 2-aminoanthraquinone and 1 mol aniline are stirred together with 300 parts of pyridine. Into the mixture are strewn 55 parts of benzoic acid metasulfochloride, and the whole is heated to 100-110° C. As soon as a sample dissolves clearly in water the pyridine is distilled in a vacuum, the residue is dissolved in warm water and the condensation product is salted out, for example with sodium chloride. After filtration, and if desired washing with brine, the product is dried. By extraction with alcohol, for example dry methylalcohol, it may be obtained free from inorganic salts.

The product corresponds probably to one of the two formulas:

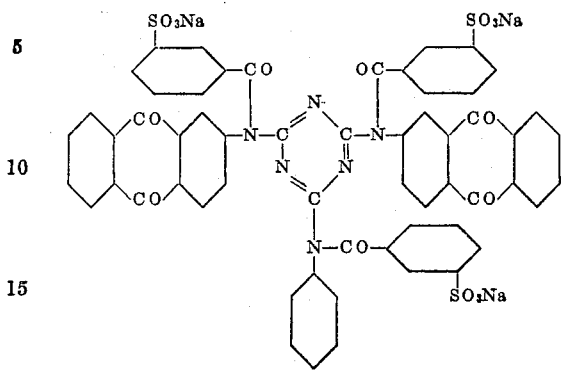

and

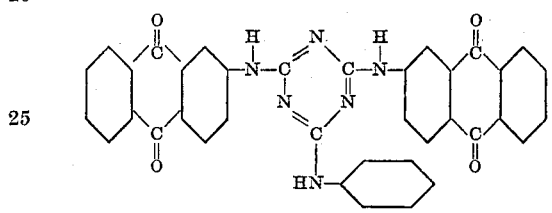

in which at least two of the hydrogen atoms linked to the nitrogen atoms are replaced by the atom grouping

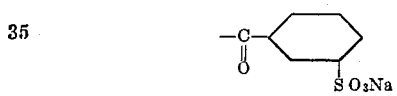

The new yellowish powder dissolves in water to a feebly yellow solution. By addition of alkali, for example ammonia, or of dilute acid, the parent pigment is precipitated, being insoluble in water.

This new product is intended for use in dyeing and printing textiles.

Products with like properties and soluble in water may be obtained by treating, for instance, the condensation product from 1 mol cyanuric chloride, 2 mols 1-amino-4-methoxyanthraquinone and 1 mol ammonia with benzoic acid metasulfochloride.

Water-soluble products which may be used in similar manner for dyeing and printing textiles are produced when in the parent product referred to in the first paragraph of this example the molecule of aniline is exchanged for ammonia or for a primary or secondary amine. Such amines are, for example, aliphatic amines, for example, ethylamine, propylamine, cycloaliphatic bases, for instance cyclohexylamine, heterocyclic bases, for instance aminotetrazole or morpholine, aromatic bases, for instance paratoluidine, monomethylaniline, α- or β-naphthylamine, α-aminoanthraquinone, aminocarbazole, 2-aminochrysene, 3-aminopyrene or the like.

The operation remains the same if in the parent product there is substituted for the 2 mols of 2-aminoanthraquinone another residue capable of being vatted, such as for example aminopyranthrone, aminopyrenequinone or aminodibenzanthrone. If the parent material selected is one of very high molecular weight, it is to be recommended that there should be used as acylating agent a product with more than one sulfo-group, for example benzoic acid disulfochloride. Finally, condensation products may also be used in which instead of cyanuric chloride other halides of heterocyclic 6-ring systems, for instance dichloroquinazoline, may be used. Thus the product of the action of benzoic acid disulfochloride on the condensation product from dichloroquinazoline and 2 mols of β-anthraquinone has the probable formula.

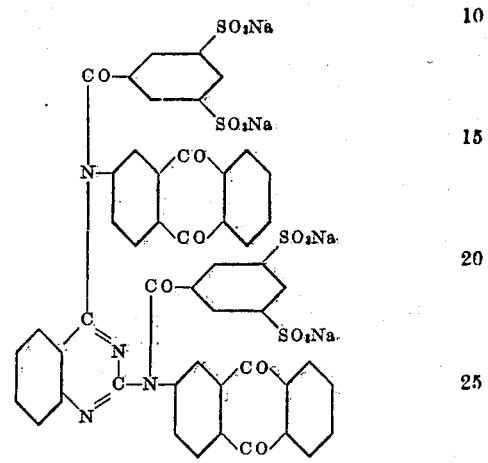

the product of the action of benzoic acid disulfochloride on the condensation product from 1 mol of aminodibenzanthrone and 2 mols of aniline and 1 mol of cyanuric chloride has the probable formula

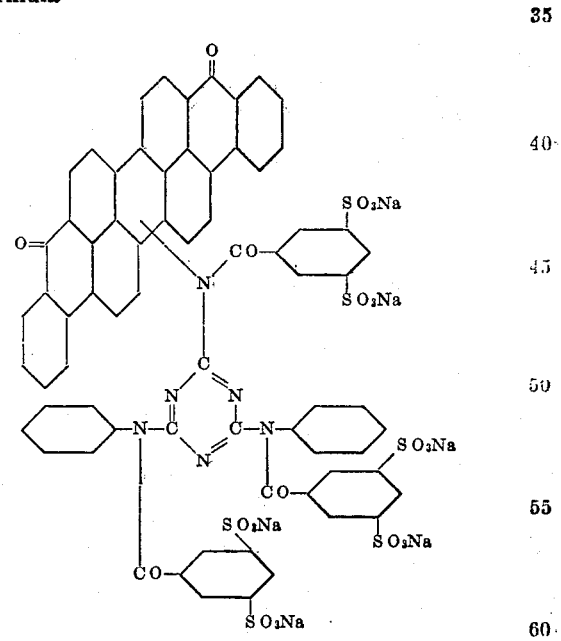

in which perhaps one of the atom groupings

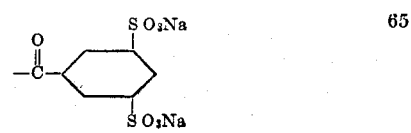

is replaced by one hydrogen atom whereas the product of the action of sulfo-chloracetic acid chloride on the condensation product from 1 mol of cyanuric chloride, 1 mol of 2-aminoanthraquinone, 1 mol of aminoazobenzene and 1 mol of aniline has probably one of the following formulas:

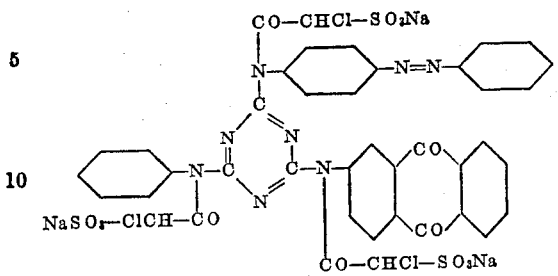

and

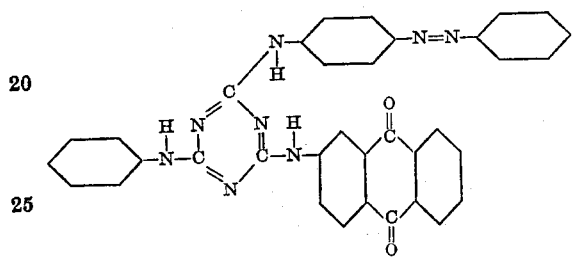

in which at least two of the hydrogen atoms linked to the nitrogen atoms are replaced by the atom grouping

Example 7

7.3 parts of the condensation product from 1 mol cyanuric chloride, 1 mol 2-aminoanthraquinone, 1 mol 4-amino-2:1-anthraquinone-acridone and 1 mol aniline are stirred together with about 70 parts of pyridine. 12.8 parts of benzoic acid 3:5-disulfochloride are added. The temperature is raised to 114° C. and the whole is stirred at the boiling temperature until a sample of the mass dissolves in water to a brown solution. As soon as this condition is attained, the pyridine is distilled at as low a temperature as possible and the procedure follows that described in Example 6. There is obtained a dark powder which corresponds probably to one of the two following formulas

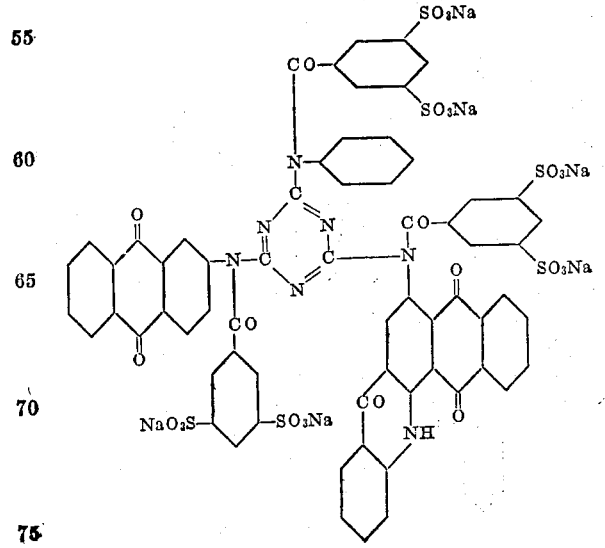

and

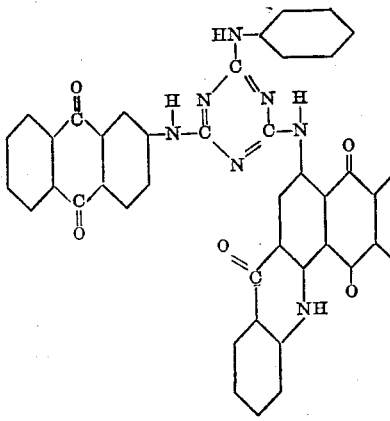

in which at least two of the hydrogen atoms linked to the nitrogen atoms are replaced by the atom grouping

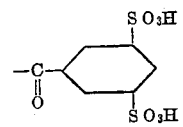

and which dissolves in water to a brown solution, wherefrom the parent material pigment may be precipitated in the form of green flocks by addition of alkali.

Example 8

A mixture of 13.3 parts of 1:5-dimonomethyl-amino-anthraquinone, 33 parts of benzoic acid metasulfochloride and 130 parts of pyridine are stirred together for 2 hours at 90–100° C. There is obtained a brown-red solution. The pyridine is distilled in a vacuum, the residue dissolved in a little water, neutralized with sodium carbonate and evaporated to dryness at the lowest possible temperature. By extracting the residue with methyl alcohol the product is obtained free from salt. The brown-red mass thus produced which corresponds probably to the formula

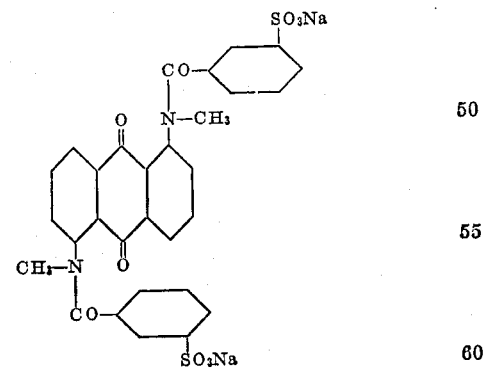

dissolves in water to a reddish solution and dyes wool in an acid bath flesh-red. When the aqueous solution of the new condensation product is warmed with caustic alkali, the parent pigment separates after some time.

Example 9

16.4 parts of 1-amino-4-paratoluidoanthraquinone are stirred with 120 parts of pyridine. Into the mixture are strewn 36 parts of toluenedisulfochloride, the temperature is raised to the boiling point and maintained there until a sample of the mass is soluble in water at the said temperature. The pyridine is removed by distillation in a vacuum and the residue may be worked up as usual. There is obtained a dark powder which corresponds probably to the formula

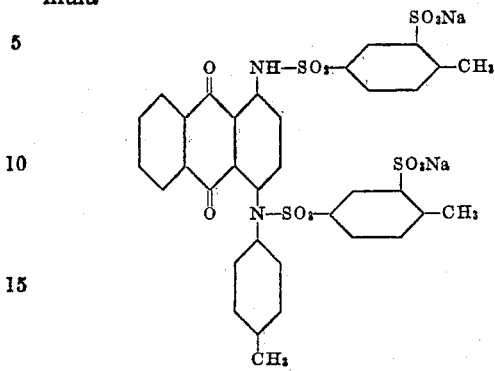

an aqueous solution of which dyes wool violet in an acid bath.

*Example 10*

6 parts of the condensation product from 1 mol cyanuric chloride with 2 mols 2-aminoanthraquinone and 1 mol aniline are heated for 3 hours at 100–110° C. with 9.6 parts of parachloromethylbenzoyl chloride in 60 parts of pyridine after which time a sample of the mass dissolves clearly in water. The pyridine is then distilled in a vacuum and the product of the reaction isolated by the procedure described in Example 6. It dissolves in water to a yellow solution from which the insoluble parent pigment is precipitated on addition of dilute alkali. The water-soluble product corresponds probably to one of the formulas

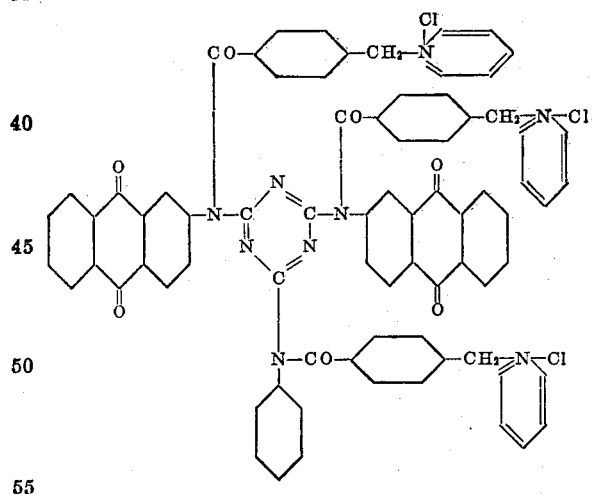

and

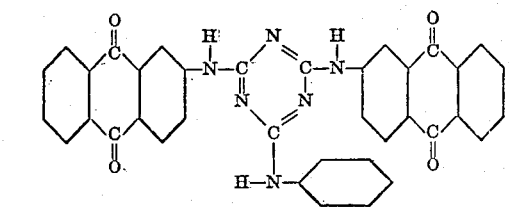

in which at least two of the hydrogen atoms linked to the nitrogen atoms are replaced by the atom grouping

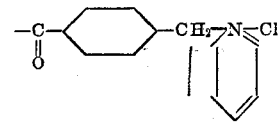

The procedure is similar with the parent materials of the preceding examples, for instance by using in this reaction stearoylmethylamide there is obtained a product of one of the probable formulas:

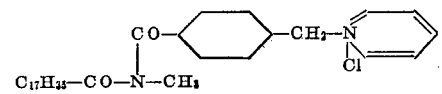

and

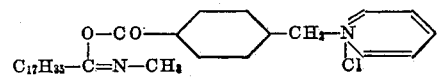

which constitutes a cation active textile assistant which in the form of a salt of a strong acid dissolves to a strongly foaming solution. The solutions are saponified easily by heating them with a saponifying agent, the stearoylmethylamide being split off. If this reaction is applied to the parent materials resembling dyestuffs used in Examples 3–9, there are obtained products which in the form of their salts are soluble in water. The probable formulas of such products are for example

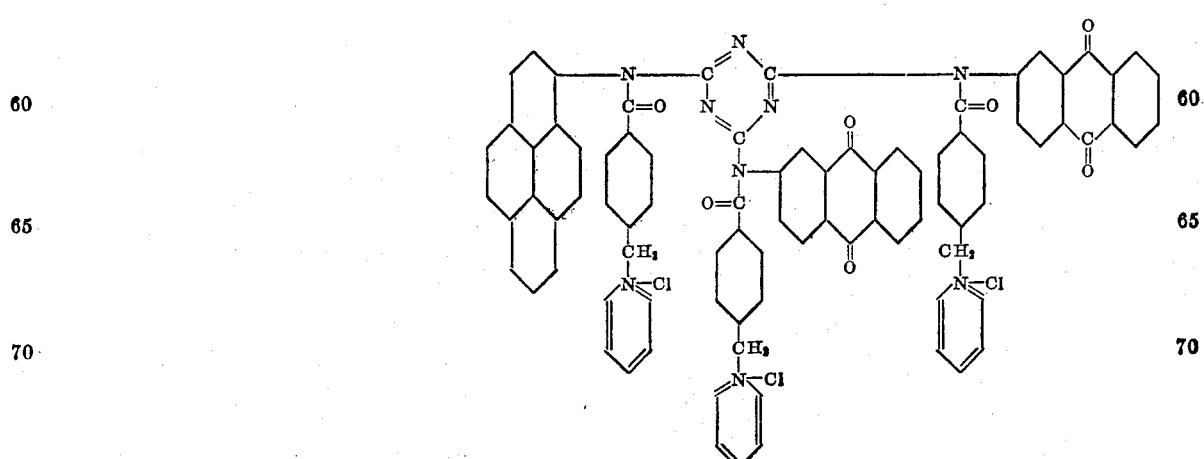

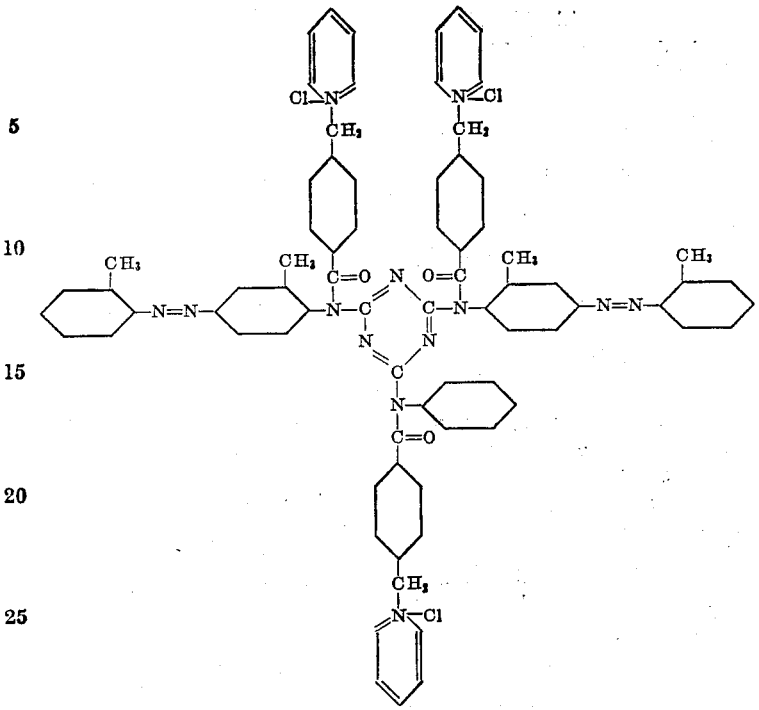

In these formulas one of the atom groupings

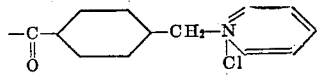

is perhaps replaced by one hydrogen atom.

*Example 11*

8 parts of the product of reaction of benzoic acid sulfochloride on the condensation product from 1 mol cyanuric chloride, 2 mols 2-aminoanthraquinone and 1 mol aniline, 33 parts of water, 54 parts of neutral starch tragacanth thickening and 5 parts of thiodiglycol are worked up to form a printing paste. A cotton fabric is printed with this paste, then dried, steamed in a Mather-Platt apparatus and developed by passage through a caustic soda solution of 6 per cent. strength at room temperature; by washing and soaping at the boil there is obtained an intense yellow print.

The fixing of the dyestuff, that is to say the splitting off of the acyl-group which lends solubility, may be performed by steaming the printed fabric for 4–5 minutes in a Mather-Platt apparatus containing formic acid vapor or by handling the printed and steamed fabric for 2–3 minutes in a bath which contains per liter 20 cubic centimeters of sulfuric acid and 25 grams of sodium sulfate, the temperature of this bath being 60–70° C.

In this manner there is obtained a yellow fast print.

What we claim is:

1. Process for the manufacture of new condensation products which comprises causing halides of mono-nuclear aromatic acids which contain simultaneously carboxyl groups and sulfonic groups, to act in the presence of pyridine on compounds of the general formula

which are free from hydroxyl groups, carboxyl groups and sulfonic groups, and in which $n$ stands for a whole number greater than 1 and smaller than 4, $R_1$ stands for the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and not more than three times the atom grouping

and

stands for the radical of a primary amine.

2. Process for the manufacture of new condensation products which comprises causing halides of mono-nuclear aromatic acids which contain simultaneously carboxyl groups and sulfonic groups, to act in the presence of pyridine on dyestuffs which are free from hydroxyl, carboxyl and sulfonic groups and correspond to the general formula

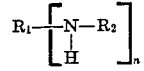

in which $n$ stands for a whole number greater than 1 and smaller than 4, $R_1$ stands for the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and not more than three times the atom grouping

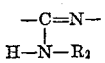

and

stands for the radical of a primary amine, said primary amine being an amino-dyestuff.

3. Process for the manufacture of new condensation products which comprises causing halides of mono-nuclear aromatic acids which contain simultaneously carboxyl groups and sulfonic groups, to act in the presence of pyridine on azo-dyestuffs which are free from hydroxyl, carboxyl and sulfonic groups and correspond to the general formula

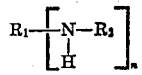

in which $n$ stands for a whole number greater than 1 and smaller than 4, $R_1$ stands for the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and not more than three times the atom grouping

and

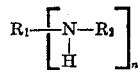

stands for the radical of a primary amine, said primary amine being an amino-azo-dyestuff.

4. Process for the manufacture of new condensation products which comprises causing halides of mono-nuclear aromatic acids which contain simultaneously carboxyl groups and sulfonic groups, to act in the presence of pyridine on anthraquinone-dyestuffs which are free from hydroxyl, carboxyl and sulfonic groups and correspond to the general formula

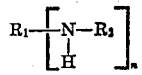

in which $n$ stands for a whole number greater than 1 and smaller than 4, $R_1$ stands for the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and not more than three times the atom grouping

and

stands for the radical of a primary amine, said primary amine being an amino-anthraquinone-dyestuff.

5. Process for the manufacture of new condensation products, which comprises causing a chloride of metasulfobenzoic acid to react on the condensation product of the formula

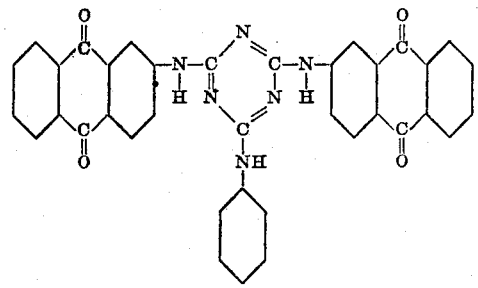

using pyridine as reaction medium.

6. The acid amide-like derivatives of the general formula

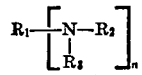

in which $n$ stands for a whole number greater than 1 and smaller than 4,

stands for the divalent radical of an amine free from hydroxyl, sulfonic and carboxyl groups, $R_1$ stands for the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and at the most three times the atom grouping

and $R_3$ stands for an acyl radical containing at least one salt forming group selected from the group consisting of carboxyl groups, sulfonic groups and quaternary ammonium groups, which products are water-soluble powders which, when treated with mild saponifying agents, regenerate the condensation product free from radicals $R_3$, hydroxyl, carboxyl and sulfonic groups and corresponding to the formula

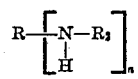

$n$, $R_1$ and $R_2$ having apart from the foregoing statement, the meaning given at the beginning of this claim.

7. The acid amide-like derivatives of the general formula

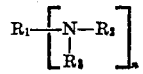

in which $n$ stands for a whole number greater than 1 and smaller than 4,

stands for the divalent radical of an amine, said amine being an amino-dyestuff free from hydroxyl, sulfonic and carboxyl groups, $R_1$ stands for the radical of a heterocyclic six-membered system whose heterocyclic six-membered ring consists of carbon and nitrogen atoms of which at least 3 and not more than 2 are carbon atoms and at least 2 and not more than 3 are nitrogen atoms, not more than 2 nitrogen atoms being linked with each other, which heterocyclic six-membered ring contains at least twice and at the most three times the atom grouping

and $R_3$ stands for an acyl radical containing at least one salt forming group selected from the group consisting of carboxyl groups, sulfonic groups and quaternary ammonium groups, which products are water-soluble powders which, when treated with mild saponifying agents, regenerate the dyestuff free from radicals $R_3$, hydroxyl, carboxyl and sulfonic groups and corresponding to the formula

$n$, $R_1$ and $R_2$ having, apart from the foregoing statement, the meaning given at the beginning of this claim.

8. The acid amide-like derivatives of the general formula

in which $n$ stands for a whole number greater than 1 and smaller than 4,

stands for the divalent radical of an amine, said amine being an amino-azo-dyestuff free from hydroxyl, sulfonic and carboxyl groups, $R_1$ stands for the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and at the most three times the atom grouping

and $R_3$ stands for an acyl radical containing at least one salt forming group selected from the group consisting of carboxyl groups, sulfonic groups and quaternary ammonium groups, which products are water-soluble powders which, when treated with mild saponifying agents, regenerate the azo-dyestuff free from radicals $R_3$, hydroxyl, carboxyl and sulfonic groups and corresponding to the formula

$n$, $R_1$ and $R_2$ having, apart from the foregoing statement, the meaning given at the beginning of this claim.

9. The acid amide-like derivatives of the general formula

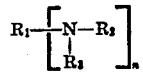

in which $n$ stands for a whole number greater than 1 and smaller than 4,

stands for the divalent radical of an amine, said amine being an amino-azo-dyestuff free from hydroxyl, sulfonic and carboxyl groups, $R_1$ stands for the radical of a triazine compound to which the

group is linked at a

grouping, and $R_3$ stands for an acyl radical containing at least one salt forming group selected from the group consisting of carboxyl groups, sulfonic groups and quaternary ammonium groups, which products are water soluble powders which, when treated with mild saponifying agents, regenerate the azo-dyestuff free from radicals $R_3$, hydroxyl, carboxyl and sulfonic groups and corresponding to the formula

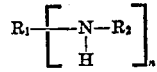

$n$, $R_1$ and $R_2$ having, apart from the foregoing statement, the meaning given at the beginning of this claim.

10. The acid amide-like derivatives of the general formula

in which $n$ stands for a whole number greater than 1 and smaller than 4,

stands for the divalent radical of an amine, said amine being an amino-anthraquinone-dyestuff which is free from hydroxyl, sulfonic and carboxyl groups, $R_1$ stands for the radical of a heterocyclic six-membered system whose heterocyclic six-membered ring consists of carbon and nitrogen atoms of which at least 2 and not more than 4 are carbon atoms and at least 2 and not more than 3 are nitrogen atoms, not more than 2 nitrogen atoms being linked with each other, which heterocyclic six-membered ring contains at least twice and not more than three times the atom grouping

and $R_3$ stands for an acyl radical containing at least one salt forming group selected from the group consisting of carboxyl groups, sulfonic groups and quaternary ammonium groups, which products are water-soluble powders which, when treated with mild saponifying agents, regenerate the anthraquinone dyestuff free from radicals $R_3$, hydroxyl, carboxyl and sulfonic groups and corresponding to the formula

$n$, $R_1$ and $R_2$ having, apart from the foregoing statement, the meaning given at the beginning of this claim.

11. The acid amide-like derivatives of the general formula

in which $n$ stands for a whole number greater than 1 and smaller than 4,

stands for the divalent radical of an amine, said amine being an amino-anthraquinone-dyestuff which is free from hydroxyl, sulfonic and carboxyl groups, $R_1$ stands for the radical of a triazine compound to which the

groups is linked at a

grouping, and $R_3$ stands for an acyl radical containing at least one salt forming group selected from the group consisting of carboxyl groups, sulfonic groups and quaternary ammonium groups, which products are water-soluble powders which, when treated with mild saponifying agents, regenerate the anthraquinone dyestuff free from radicals $R_3$, hydroxyl, carboxyl and sulfonic groups and corresponding to the formula

$n$, $R_1$ and $R_2$ having, apart from the foregoing statement, the meaning given at the beginning of this claim.

12. The acid amide-like derivatives of the general formula

in which $n$ stands for a whole number which is greater than one and smaller than 4,

stands for the divalent radical of an amine, said amine being an amino-azo-dyestuff which is free from hydroxyl, sulfonic and carboxyl groups, $R_1$ stands for the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and at the most three times the atom grouping

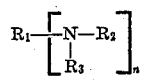

and $R_3$ stands for an acyl radical which corresponds to the formula

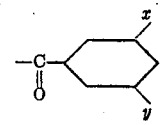

$x$ standing for a member of the group consisting of the sulphonic acid radical and alkali metal sulfonate radicals and $y$ for a member of the group consisting of H, the sulphonic acid radical and alkali metal sulfonate radicals, which products are water-soluble powders, which when treated with mild saponifying agents, regenerate the azo-dyestuff which is free from radicals $R_3$, hydroxyl, carboxyl and sulfonic groups and corresponds to the formula

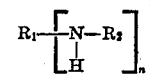

$n$, $R_1$ and

having apart from the foregoing statement the above given meaning.

13. The acid amide-like derivatives of the general formula

in which $n$ stands for a whole number which is greater than one and smaller than 4,

stands for the divalent radical of an amine, said amine being an amino-anthraquinone-dyestuff which is free from hydroxyl, sulfonic and carboxyl groups, $R_1$ stands for the radical of a heterocyclic six-membered system whose heterocyclic six-membered ring consists of carbon and nitrogen atoms of which at least 3 and not more than 4 are carbon atoms and at least 2 and not more than 3 are nitrogen atoms, not more than 2 nitrogen atoms being linked with each other, which heterocyclic six-membered ring contains at least twice and at the most three times the atom grouping

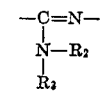

and $R_3$ stands for an acyl radical which corresponds to the formula

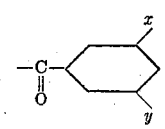

$x$ standing for a member of the group consisting of the sulphonic acid radical and alkali metal sulfonate radicals and $y$ for a member of the group consisting of H, the sulphonic acid radical and alkali metal sulfonate radicals, which products are water-soluble powders, which when treated with mild saponifying agents, regenerate the anthraquinone-dyestuff which is free from radicals $R_3$, hydroxyl, carboxyl and sulfonic groups and corresponds to the formula

$n$, $R_1$ and

having apart from the foregoing statement the above given meaning.

14. The acid amide-like derivatives of the general formula

in which $n$ stands for a whole number greater than one and smaller than 4,

stands for the radical of an amine, said amine being an amino-anthraquinone dyestuff which is free from hydroxyl, sulfonic and carboxyl groups, $R_1$ stands for the radical of a triazine compound to which the —N—$R_2$ group is linked at a

grouping and $R_3$ stands for an acyl radical which corresponds to the formula

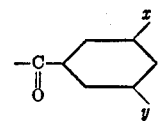

$x$ standing for a member of the group consisting of the sulphonic acid radical and alkali metal sulfonate radicals and $y$ for a member of the group consisting of H, the sulphonic acid radical and alkali metal sulfonate radicals, which products are water-soluble powders which, when treated with mild saponifying agents, regenerate the anthraquinone dyestuff free from radicals $R_3$, hydroxyl, carboxyl and sulfonic groups and corresponding to the formula

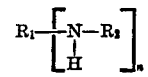

$n$, $R_1$ and $R_2$ having, apart from the foregoing statement, the meaning given at the beginning of this claim.

CHARLES GRAENACHER.
FRANZ ACKERMANN.
HEINRICH BRUENGGER.